US010274374B2

(12) United States Patent
Sugino et al.

(10) Patent No.: US 10,274,374 B2
(45) Date of Patent: Apr. 30, 2019

(54) INFRARED SENSOR AND INFRARED SOLID-STATE IMAGE PICKUP APPARATUS

(71) Applicant: Mitsubishi Electric Corporation, Tokyo (JP)

(72) Inventors: Takaki Sugino, Tokyo (JP); Kenji Shintani, Tokyo (JP); Koji Misaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/810,369

(22) Filed: Nov. 13, 2017

(65) Prior Publication Data

US 2018/0340836 A1    Nov. 29, 2018

(30) Foreign Application Priority Data

May 24, 2017  (JP) .................................. 2017-102744

(51) Int. Cl.
*G01J 5/20* (2006.01)
*G01J 5/06* (2006.01)
*G01J 5/00* (2006.01)

(52) U.S. Cl.
CPC . *G01J 5/20* (2013.01); *G01J 5/06* (2013.01); *G01J 2005/0077* (2013.01); *G01J 2005/202* (2013.01)

(58) Field of Classification Search
USPC .................................................. 250/338.1
See application file for complete search history.

(56) References Cited

U.S. PATENT DOCUMENTS

| 5,286,976 | A | 2/1994 | Cole |
| 6,144,030 | A | 11/2000 | Ray et al. |
| 6,475,836 | B1* | 11/2002 | Suzawa ............. H01L 21/31116 257/E21.252 |
| 2006/0094150 | A1* | 5/2006 | Lee ..................... B81C 1/00126 438/57 |
| 2007/0120058 | A1* | 5/2007 | Blackwell ............... G01J 5/061 250/338.1 |

(Continued)

FOREIGN PATENT DOCUMENTS

| JP | 04-102321 A | 4/1992 |
| JP | 2001255203 A | 9/2001 |

(Continued)

OTHER PUBLICATIONS

Communication dated Dec. 11, 2018, from the Japanese Patent Office in counterpart Application No. 2017-102744.

(Continued)

*Primary Examiner* — Yara B Green
(74) *Attorney, Agent, or Firm* — Sughrue Mion, PLLC; Richard C. Turner (57) ABSTRACT

An infrared sensor includes an infrared sensor pixel in which a contact hole is formed to electrically connect a metal wiring layer and a support leg metal wiring layer that is located inside a support leg. The metal wiring layer is electrically connected to a signal reading circuit. The contact hole is formed by etching an insulating layer that is formed by deposition so as to cover the metal wiring layer, and has a bottom portion and a side wall portion that are each shaped into a forward tapered shape.

14 Claims, 8 Drawing Sheets

(56) References Cited

U.S. PATENT DOCUMENTS

| | | | | |
|---|---|---|---|---|
| 2014/0353506 | A1* | 12/2014 | Nam | G01J 5/20 |
| | | | | 250/349 |
| 2015/0001663 | A1* | 1/2015 | Lee | H01L 27/14627 |
| | | | | 257/432 |
| 2017/0154875 | A1* | 6/2017 | Uzoh | H01L 25/0657 |
| 2017/0241840 | A1* | 8/2017 | Pocas | G01J 5/024 |

FOREIGN PATENT DOCUMENTS

| | | |
|---|---|---|
| JP | 2005-229052 A | 8/2005 |
| JP | 2006226891 A | 8/2006 |
| JP | 3944465 B2 | 7/2007 |
| WO | 2016159322 A1 | 10/2016 |

OTHER PUBLICATIONS

Communication dated May 29, 2018, from the Japanese Patent Office in counterpart Application No. 2017-102744

* cited by examiner

INFRARED SENSOR AND INFRARED SOLID-STATE IMAGE PICKUP APPARATUS

BACKGROUND OF THE INVENTION

1. Field of the Invention

The present invention relates to an infrared sensor that is inventive in terms of the shape of a contact hole formed in an infrared sensor pixel, and to an infrared solid-state image pickup apparatus that includes the infrared sensor.

2. Description of the Related Art

Infrared solid-state image pickup apparatus are roughly divided into a quantum type, which captures an infrared ray emitted from an object as photons, and a thermal type, which captures the infrared ray as heat.

A quantum infrared solid-state image pickup apparatus is equipped with a quantum infrared sensor configured to capture an infrared ray as photons. While this gives the quantum infrared solid-state image pickup apparatus favorable characteristics such as high sensitivity and high responsiveness, a refrigerating machine is required to cool the quantum infrared sensor down to around −200° C. The quantum infrared solid-state image pickup apparatus is therefore complicated in structure and expensive.

A thermal infrared solid-state image pickup apparatus, on the other hand, is equipped with a thermal infrared sensor configured to capture an infrared ray as thermal energy, which is generated from the resonant motion of molecules, and to convert a change in temperature of each pixel placed in the thermal infrared sensor into an electric signal. The thermal infrared solid-state image pickup apparatus therefore does not require the refrigerating machine and can operate at room temperature.

Thermal infrared solid-state image pickup apparatus are thus advantageous over quantum infrared solid-state image pickup apparatus in terms of the downsizing of the apparatus and the lowering of the price. Mainly thermal infrared solid-state image pickup apparatus are therefore employed in the security field, the in-vehicle apparatus field, and other consumer fields. Against this background, research and development for raising the sensitivity of a thermal infrared sensor is being conducted actively.

One possible way to improve the sensor sensitivity is devising a better heat insulation structure of the thermal infrared sensor (see, for example, U.S. Pat. Nos. 5,286,976, 6,144,030, and Japanese Patent No. 3944465). More specifically, in order to improve the sensor sensitivity, the heat conductance of a support leg can be made low by setting the support leg length to the maximum within a pitch between pixels arranged in the sensor.

In the related art disclosed in U.S. Pat. No. 5,286,976, a thermal sensor has a microbridge structure in which a bolometer film functioning as a temperature sensor portion is lifted above a substrate by support legs that are formed from a highly heat insulative thin film having high heat resistance. More specifically, the bolometer film in the microbridge structure is thermally isolated from the substrate (a portion of the substrate that functions as a heat sink) by the support legs. The temperature sensor portion is electrically coupled to a circuit portion by a thin film metal wiring layer formed in the support legs. With this structure where the temperature sensor portion and the support leg portions are formed in the same layer, it is difficult to set the support leg length long.

In the related art disclosed in U.S. Pat. No. 6,144,030, a thermal sensor has a two-layer structure in which support legs and a temperature sensor portion are formed in one layer and an infrared ray absorbing layer is formed in another layer. When this structure is employed, it becomes easier to set the support leg length long than in the related art of U.S. Pat. No. 5,286,976, and heat insulation characteristics can be accordingly improved.

In the related art described in Japanese Patent No. 3944465, a thermal sensor has a three-layer structure in which support legs, a temperature sensor portion, and an infrared ray absorbing layer are formed in respective layers. When this structure is employed, heat insulation characteristics is improved as in the related art of U.S. Pat. No. 6,144,030, and a rise in heat treatment temperature is facilitated when the temperature sensor portion is formed. This facilitates the recovery of a layer damaged by plasma from a plasma processor and, as a result, improving the S/N ratio of the infrared sensor is made easy.

Indispensable conditions for accomplishing the downsizing and price lowering of an infrared solid-state image pickup apparatus equipped with an infrared sensor are to shrink the chip size and downsize an optical lens while narrowing the pitch between infrared sensor pixels arranged in the infrared sensor. However, narrowing of the pixel pitch in an infrared sensor of the related art requires setting the support leg length short, and a heat conductance of the support legs may therefore increase as a result. The heat conductance of the support legs in this case can be reduced by forming a support leg metal wiring layer, from which the support legs are formed, into a thin film. A drawback is that disconnection occurs in the support leg metal wiring layer that is a thin film because a side wall of a contact hole for electrically connecting the support leg metal wiring layer and a metal wiring layer has a vertical shape. This is due to the use of a known physical vapor deposition (PVD) technology in the forming of the support leg metal wiring layer, and to the characteristics of PVD in that the amount of metal particles deposited as a film is smaller on the vertical side wall of the contact hall than on a flat surface portion because the deposition utilizes a component of ions that vertically enter a substrate. Excessive reduction of the deposited amount of a metal thin film on a flat surface portion for the purpose of reducing the heat conductance therefore means an even smaller deposited amount of a film on a vertical portion, and can lead to a failure in forming a film by deposition on the vertical portion of the side wall of the contact hall, which causes disconnection between the support leg metal wiring layer and the metal wiring layer. Disconnection between the support leg metal wiring layer and the metal wiring layer due to the use of a known PVD technology may occur also when the metal wiring layer is shaped like an overhang above the contact hall having a vertical side wall and prevents the forming of a metal thin film by deposition on an upper portion of the vertical side wall. The disconnection mode described above is liable to occur when the metal thin film is 100 nm or less in thickness, and is particularly noticeable when a metal thin film having a thickness of 30 nm or less is used.

SUMMARY OF THE INVENTION

The present invention has been made to solve the problems described above, and it is therefore an object of the present invention to provide an infrared sensor capable of preventing an increase in heat conductance of support legs even when the support leg length needs to be set short, by giving a better-suited shape to a contact hole that is formed in an infrared sensor pixel and forming a support leg metal wiring layer into a thin film, and to provide an infrared solid-state image pickup apparatus that includes the infrared sensor.

According to one embodiment of the present invention, there is provided an infrared sensor including an infrared sensor pixel in which a contact hole is formed to electrically connect a metal wiring layer and a support leg metal wiring layer, the metal wiring layer being electrically connected to a signal reading circuit, the support leg metal wiring layer being located inside a support leg, in which: the contact hole is formed by etching an insulating layer that is formed by deposition so as to cover the metal wiring layer; and the contact hole has a bottom portion and a side wall portion that are each shaped into a forward tapered shape.

According to the present invention, it is possible to provide the infrared sensor capable of preventing the increase in heat conductance of the support legs even when the support leg length needs to be set short, by giving the better-suited shape to the contact hole that is formed in the infrared sensor pixel and forming the support leg metal wiring layer into a thin film, and to provide the infrared solid-state image pickup apparatus that includes the infrared sensor.

DESCRIPTION OF THE EMBODIMENTS

Now, an infrared sensor and an infrared solid-state image pickup apparatus that includes the infrared sensor according to exemplary embodiments of the present invention are described with reference to the drawings. In the illustration of the drawings, the same components or the corresponding components are denoted by the same reference symbols, and the overlapping description thereof is omitted.

First Embodiment

Figure 1:
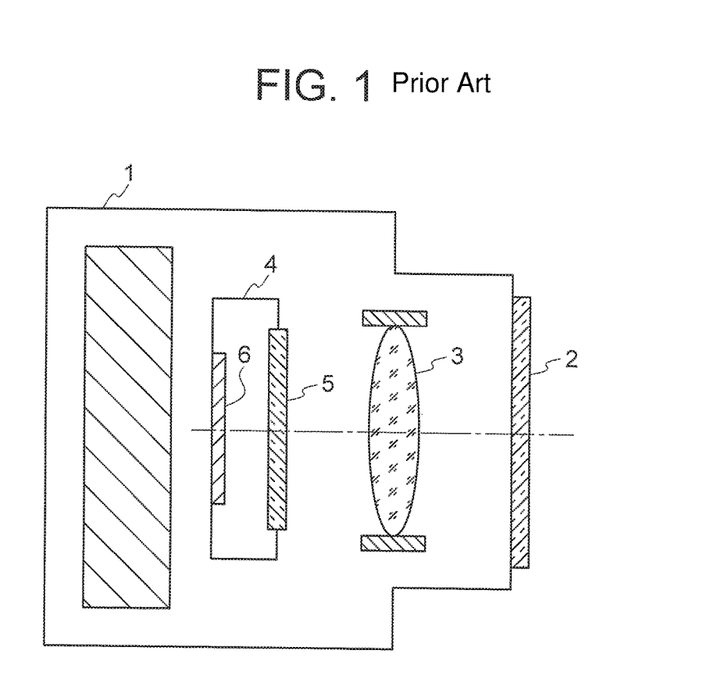
FIG. 1 is a block diagram for illustrating an infrared solid-state image pickup apparatus of the related art.
Figure 2:
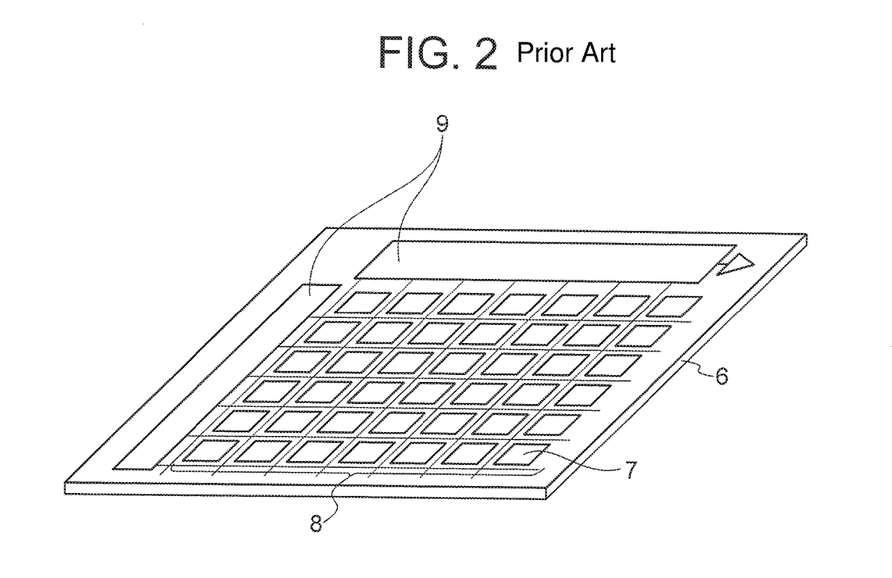
FIG. 2 is a perspective view of a thermal infrared sensor of FIG. 1.
Figure 3:
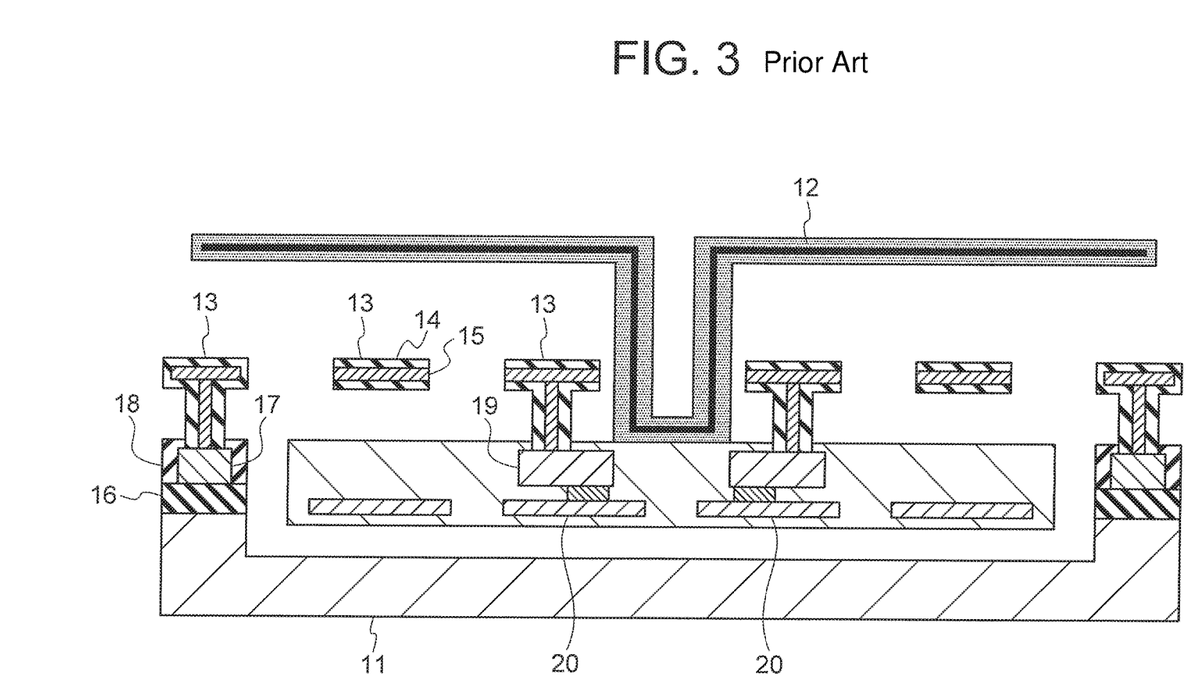
FIG. 3 is a structural sectional view of an infrared sensor pixel of FIG. 2.

A thermal infrared sensor 6 of the related art is described first with reference to FIG. 1 to FIG. 3, as a comparative example in order to clarify technical features of a thermal infrared sensor according to a first embodiment of the present invention. FIG. 1 is a block diagram for illustrating an infrared solid-state image pickup apparatus of the related art. FIG. 2 is a perspective view of the thermal infrared sensor 6 of FIG. 1. FIG. 3 is a structural sectional view of an infrared sensor pixel 7 of FIG. 2.

As illustrated in FIG. 1, the infrared solid-state image pickup apparatus, which is an application example of the thermal infrared sensor, includes an apparatus main body 1, a lens protection window member 2, which is provided at an opening in the apparatus main body 1, an optical lens 3 and a package 4, which are provided inside the apparatus main body 1, a package window member 5, which is provided opening the package 4, and the thermal infrared sensor 6, which is provided inside the package 4.

In the infrared solid-state image pickup apparatus, an infrared ray emitted from an object is collected by the optical lens 3 through the lens protection window member 2, is transmitted through the package window member 5, and then enters the thermal infrared sensor 6 to form an image.

The thermal infrared sensor 6 includes, as illustrated in FIG. 2, an infrared sensor array 8, which is constructed by arranging a plurality of infrared sensor pixels 7 in lines, and signal reading circuits 9.

The infrared sensor pixels 7 are configured to sense an infrared ray that enters the thermal infrared sensor 6, and to convert the infrared ray into an electric signal. The signal reading circuits 9 are configured to read the electric signal from the infrared sensor pixels 7, and to transmit the read electric signal to a signal processing unit (not shown).

Assuming that an optical material used for an optical system of the infrared solid-state image pickup apparatus has a transmittance of 80%, for example, the energy of an infrared ray that enters the thermal infrared sensor 6 is approximately a half of the energy of an infrared ray that enters the infrared solid-state image pickup apparatus. It is therefore preferred to use an optical material that has high transmittance for the optical system in order to raise the sensitivity of the infrared solid-state image pickup apparatus.

However, when an optical material that has high transmittance is used, the cost of the infrared solid-state image pickup apparatus increases. Specifically, the use of germanium, which is on one hand high in transmittance in an infrared wavelength range and is on the other hand expensive, as the optical material leads to an increase in cost of the image pickup apparatus.

Considering the cost of the infrared solid-state image pickup apparatus, it is demanded to devise a way to improve the sensitivity of the thermal infrared sensor 6, instead of using a high transmittance material as the optical material.

An infrared ray absorbing layer 12, two support legs 13, and a temperature sensor 20 are formed on a substrate 11, which is a silicon substrate or a similar substrate, in each infrared sensor pixel 7 as illustrated in FIG. 3. A portion of the substrate 11 that is below the temperature sensor 20 is removed to form a hollow that puts a distance between the substrate 11 and the temperature sensor 20.

A contact hole for electrically connecting a metal wiring layer 17 and a support leg metal wiring layer 15 is also formed in the infrared sensor pixel 7. The metal wiring layer 17 is electrically connected to the signal reading circuits 9, and the support leg metal wiring layer 15 is located inside the support legs 13. The contact hole is formed by etching an insulating layer 18, which is formed by deposition so as to cover the metal wiring layer 17. In other words, the contact hole is formed by etching only the insulating layer 18 and not the metal wiring layer 17. The thus formed contact hole has a horizontal bottom portion and a side wall portion perpendicular to the bottom portion.

A support leg insulating layer 14 and the support leg metal wiring layer 15 are formed by deposition in the contact hole, and are etched as needed to form the support legs 13 from the support leg insulating layer 14 and the support leg metal wiring layer 15.

In the thus formed support legs 13, the support leg metal wiring layer 15 is covered all around with the support leg insulating layer 14. An end of one of two support legs 13 is electrically connected to the metal wiring layer 17, and the other end of the one support leg 13 is electrically connected to the metal wiring layer 19 and bent above the temperature sensor 20. The other of two support legs 13 has the same configuration.

The metal wiring layer 17 is electrically connected to the signal reading circuits 9, and the metal wiring layer 19 is electrically connected to the temperature sensor 20. The metal wiring layer 17 is formed on an insulating layer 16, which is formed on the substrate 11. The metal wiring layer 17 is covered all around with the insulating layer 18, which is formed on the insulating layer 16.

An infrared ray that enters from above the substrate 11 is absorbed by the infrared ray absorbing layer 12, which is the topmost layer, and heat generated by the absorption is transmitted to the temperature sensor 20. The temperature sensor 20 transmits an electric signal representing a change in electrical characteristics that is caused by a temperature change to the signal reading circuits 9 via the support leg metal wiring layer 15 inside the support legs 13.

The heat conductance of the support legs 13 is now examined. The heat conductance fluctuates greatly depending on the material of the support legs 13. The heat conductance of the support legs 13 when the total length of the support legs 13, namely, a support leg length, is 50 μm, for example, is preliminarily calculated.

The premise of the preliminary calculation includes setting the width of each support leg 13 to 1.0 μm, and also includes setting the support leg insulating layer 14 and the support leg metal wiring layer 15 from which the support legs 13 are formed to the following conditions.
<Support Leg Insulating Layer 14>
Film: oxide film
Thickness of oxide film: 0.5 μm
Heat conductivity of oxide film: 1.38 W/m·K
<Support Leg Metal Wiring Layer 15>
Film: titanium film
Thickness of titanium film: 0.1 μm
Heat conductivity of titanium film: 21.9 W/m·K The heat conductance of the oxide film and the heat conductance of the titanium film that are estimated from the conditions given above are approximately 8.3 nW/K and approximately 44 nW/K, respectively. The heat conductance of the support legs 13 is the sum of the heat conductance of the oxide film and the heat conductance of the titanium film, and is accordingly approximately 52.3 nW/K.

While setting the support leg length long is one possible way to reduce the support leg heat conductance, the support leg length needs to be short when the pixel pitch is to be narrowed in the thermal infrared sensor of the related art as described above. Reducing the support leg heat conductance in this case accordingly requires setting the layer thickness of the support legs 13 thin. However, the heat conductance of the oxide film itself is small in the first place at approximately ⅕ of the heat conductance of the titanium film, and it is apparent that forming the titanium film, namely, the metal wiring layer, into a thin film is effective.

The thermal infrared sensor according to the first embodiment makes the metal wiring layer of the support legs a thin film by devising a better-suited shape of the contact hole described above, in order to reduce the support leg heat conductance. Specifically, a better-suited shape is devised for a contact hole that is used to form support legs 111 in the first embodiment.

A detailed description is given below on a difference between the thermal infrared sensor 6 of the related art and the thermal infrared sensor according to the first embodiment, namely, the contact hole shape that is a technical feature of the thermal infrared sensor according to the first embodiment, whereas a description on the rest is omitted.

The support legs 111 in the first embodiment are described with reference to FIG. 4 to FIG. 10. FIG. 4 to FIG. 10 are structural sectional views for illustrating first to seventh processes of forming the support legs 111 in the first embodiment of the present invention. The support legs 111 are formed from a support leg lower portion insulating layer 108, a support leg metal wiring layer 109, and a support leg upper portion insulating layer 110, which are described later.

As illustrated in FIG. 4 to FIG. 10, an insulating layer 102 is formed by deposition on a support substrate 101, and a metal wiring layer 103 is formed directly on the insulating layer 102. The support substrate 101, the insulating layer 102, and the metal wiring layer 103 correspond respectively to the substrate 11, the insulating layer 16, and the metal wiring layer 17, which are illustrated in FIG. 3.

While it goes without saying that the forming of the infrared sensor array 8 and the signal reading circuits 9 is a necessary manufacturing step in the manufacture of the thermal infrared sensor 6, the description given here focuses on details of the shape of a contact hole 105, which is a technical feature of the thermal infrared sensor according to the first embodiment, as stated above.

Figure 4:
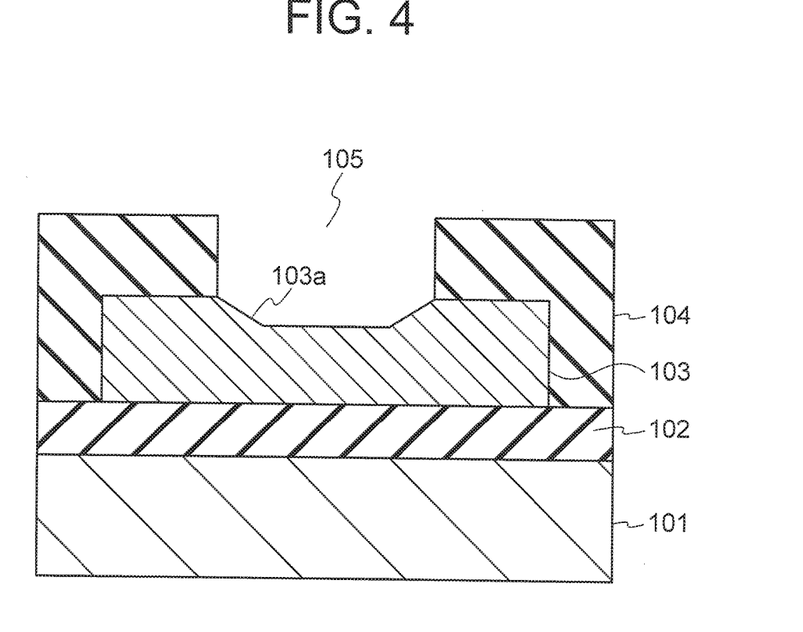
FIG. 4 is a structural sectional view for illustrating a first process of forming support legs in a first embodiment of the present invention.

First, a known plasma chemical vapor deposition (P-CVD) apparatus, for example, is used to form an insulating layer 104 by deposition on the insulating layer 102 so as to cover the metal wiring layer 103 all around. The insulating layer 104 corresponds to the insulating layer 18 illustrated in FIG. 3. A material that can be used for the metal wiring layer 103 is AlCu, AlSi, AlSiCu, or a similar alloy. The thickness of the metal wiring layer 103 that is preferred from the viewpoint of lowering the wiring resistance is 200 nm to 1,000 nm. The insulating layer 104 can have any thickness around 100 nm to 1,000 nm as long as the dielectric strength voltage of the support leg metal wiring layer 109 and the metal wiring layer 103 is secured. A known photoengraving technology and a known dry etching technology are subsequently applied to perform etching processing on the insulating layer 104 and form the contact hole 105 as illustrated in FIG. 4.

In the etching processing performed on the insulating layer 104 to form the contact hole 105, the metal wiring layer 103 is etched as well as the insulating layer 104 to an appropriate etching depth from the surface so that a forward tapered portion 103a is formed on an inner side surface of the metal wiring layer 103. In other words, the metal wiring layer 103 is also etched in the etching processing of the insulating layer 104 so that a bottom portion of the contact hole 105 is given a forward tapered shape, to thereby form the forward tapered portion 103a in an upper portion of the metal wiring layer 103. Etching conditions for forming the contact hole include, for example, using an Ar/CF$_4$/CHF$_3$ gas and performing reactive ion etching (RIE) by applying an RF power of 1.3 kW at a pressure of 300 mT.

The etching depth of the metal wiring layer 103 is adjusted suitably so that the coverage of the support leg metal wiring layer 109, which is described later, is stabilized, and so that the electrical reliability of the etched metal wiring layer 103 is not lost.

The contact hole is thus formed by etching the insulating layer 104, which is formed by deposition so as to cover the metal wiring layer 103. A forward tapered surface is formed on a side surface of the bottom portion of the contact hole 105 by etching the metal wiring layer 103 in addition to the insulating layer 104 so that the forward tapered portion 103a is formed.

Figure 5:
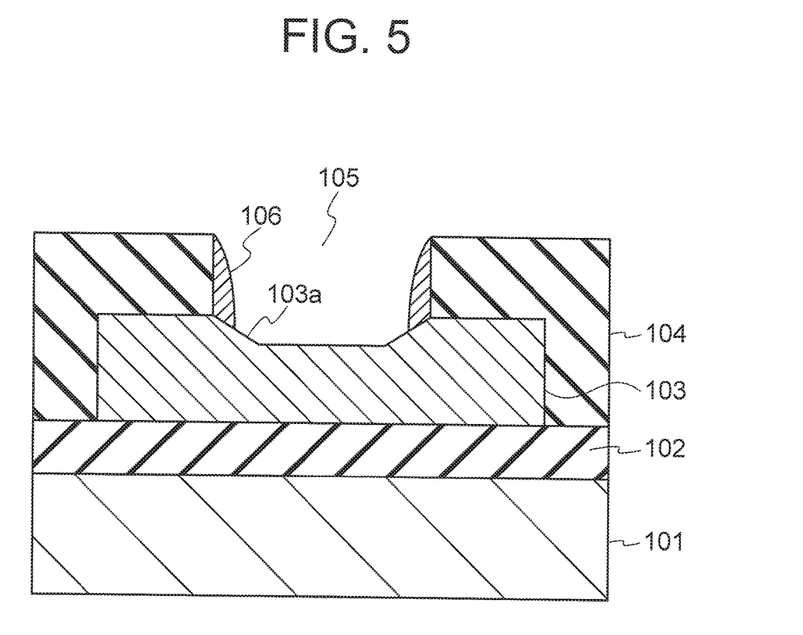
FIG. 5 is a structural sectional view for illustrating a second process of forming the support legs in the first embodiment of the present invention.

An oxide film is formed next by deposition with the use of, for example, a P-CD apparatus, on the layer structure illustrated in FIG. 4. Then, a portion of the oxide film that is formed by deposition inside the contact hole 105 is etched by an oxide film dry etcher so that a side wall 106 having a forward tapered shape is formed on a side wall portion of the contact hole 105. This etching removes other portions of the oxide film than the side wall 106 having a forward tapered shape. In other words, the side wall 106 having a forward tapered shape is formed on the inner side surface of the etched insulating layer 104 so that the side wall portion of the contact hole 105 is given a forward tapered shape. Etching conditions for forming the side wall include, for example, using an Ar/CF$_4$/CHF$_3$ gas and performing RIE by applying an RF power of 1.3 kW at a pressure of 300 mT.

A forward tapered surface is thus formed on a surface of the side wall portion of the contact hole 105 by forming the side wall 106, which has a forward tapered shape, on the side wall portion of the contact hole 105.

As is understood from FIG. 4 and FIG. 5 described above, the steps of shaping the bottom portion and side wall portion of the contact hole 105 into forward tapered shapes are executed as preliminary steps to the forming of the support legs 111.

Specifically, the side wall portion of the contact hole 105 is given a forward tapered shape by forming the side wall 106, which has a forward tapered shape, on the inner side surface of the etched insulating layer 104 after the etching for forming the contact hole 105 is executed. The bottom portion of the contact hole 105 is also given a forward tapered shape by forming the forward tapered portion 103a in the upper portion of the metal wiring layer 103 in the etching for forming the contact hole 105.

Figure 6:
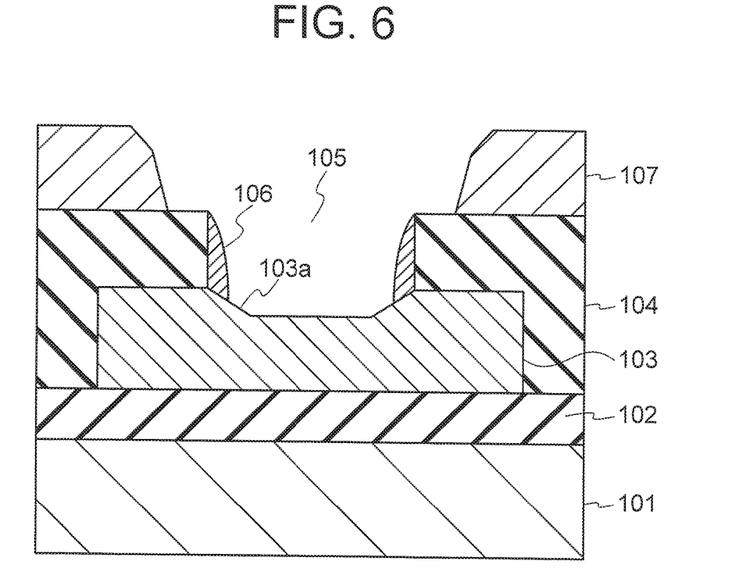
FIG. 6 is a structural sectional view for illustrating a third process of forming the support legs in the first embodiment of the present invention.

A sacrificial layer 107 is formed next by deposition on the layer structure illustrated in FIG. 5. As illustrated in FIG. 6, a portion of the sacrificial layer 107 that is formed by deposition inside the contact hole 105 is subsequently removed by development that employs a known photoengraving technology. The removal leaves only a portion of the sacrificial layer 107 that is formed by deposition on the insulating layer 104 and that includes a side surface having a forward tapered shape.

The material of the sacrificial layer 107 can be any material that can be formed into a pattern by a photoengraving technology. For example, a photosensitive organic material (e.g., a photoresist) can be used. It is preferred to set the sacrificial layer 107 to a thickness that can absorb level differences in the underlying layers in order to facilitate the forming of the support leg metal wiring layer 109, which is formed above the sacrificial layer 107.

Figure 7:
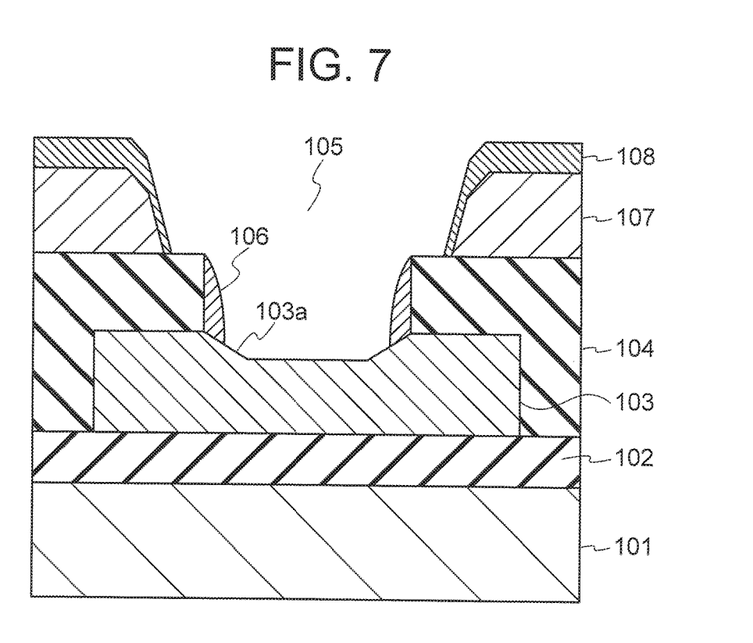
FIG. 7 is a structural sectional view for illustrating a fourth process of forming the support legs in the first embodiment of the present invention.

The support leg lower portion insulating layer 108 is formed next by deposition on the layer structure illustrated in FIG. 6, to an appropriate thickness by applying, for example, a known physical vapor deposition (PVD) technology. The thickness of the support leg lower portion insulating layer 108 is preferred to be as thin as possible, between 50 nm and 300 nm from the viewpoint of the support leg heat conductance. As illustrated in FIG. 7, a portion of the support leg lower portion insulating layer 108 that is formed by deposition inside the contact hole 105 is subsequently removed by etching that employs a known photoengraving technology. The removal leaves only a portion of the support leg lower portion insulating layer 108 that is formed by deposition on the sacrificial layer 107 and that includes a side surface having a forward tapered shape. Etching conditions for the removal include, for example, using an Ar/CF$_4$/CHF$_3$ gas and performing RIE by applying an RF power of 1.3 kw at a pressure of 300 mT.

Figure 8:
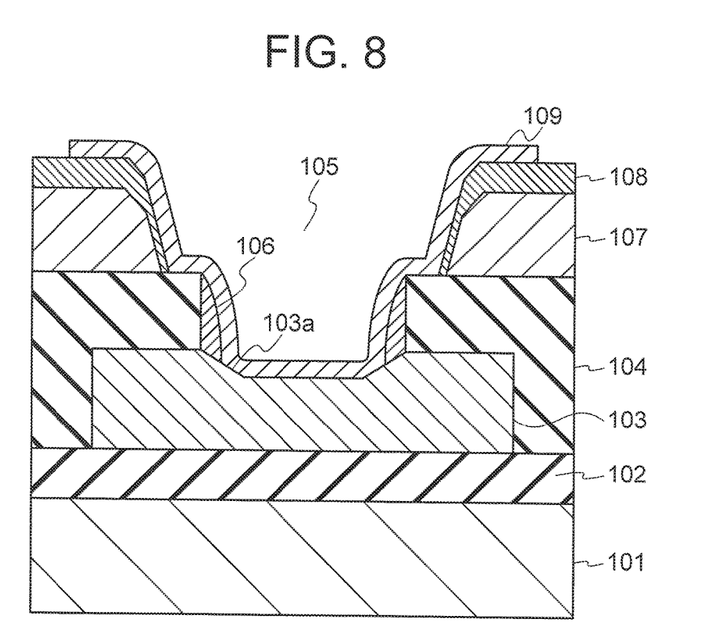
FIG. 8 is a structural sectional view for illustrating a fifth process of forming the support legs in the first embodiment of the present invention.

The support leg metal wiring layer 109 is formed next by deposition on the layer structure illustrated in FIG. 7, to an appropriate thickness by applying, for example, a known physical vapor deposition (PVD) technology as illustrated in FIG. 8.

The thickness of the support leg lower portion insulating layer 108 and the thickness of the support leg metal wiring layer 109 are adjusted suitably so that the layers 108 and 109 do not break apart on the side wall portion of the contact hole 105, and so that stable ohmic contact performance can be secured. In order to reduce the heat conductance of the support legs 111, it is preferred to make the support leg metal wiring layer 109 as thin as possible as described above, while securing stable ohmic contact performance. The material that can be used for the support leg metal wiring layer 109 is Ti, TiN, or a similar metal material. The support leg metal wiring layer 109 can be formed by, for example, PVD in which an Ar gas is used and a DC power of 1.2 kW is applied at a pressure of 5 mTorr.

Figure 9:
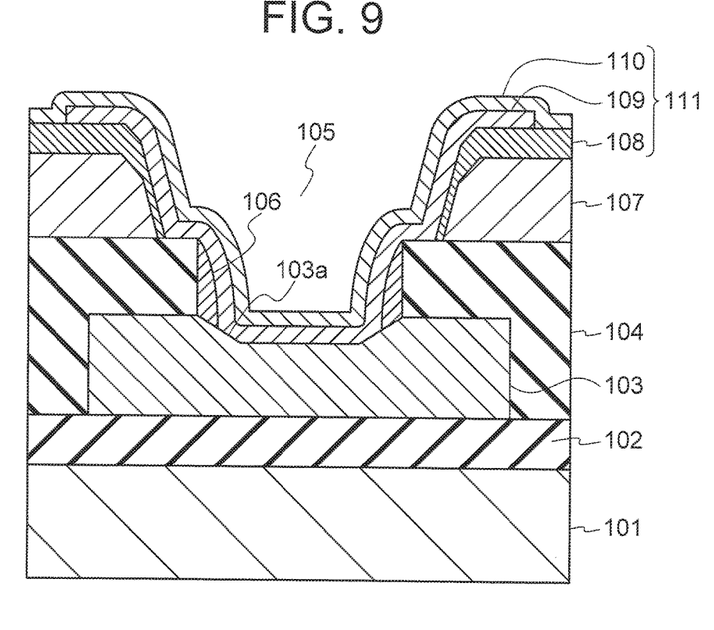
FIG. 9 is a structural sectional view for illustrating a sixth process of forming the support legs in the first embodiment of the present invention.

The support leg upper portion insulating layer 110 is formed next by deposition on the layer structure illustrated in FIG. 8, to an appropriate thickness by applying, for example, a known PVD technology as illustrated in FIG. 9. The thickness of the support leg upper portion insulating layer 110 is preferred to be as thin as possible, between 50 nm to 300 nm, from the viewpoint of the support leg heat conductance. This electrically connects a lower portion of the support leg metal wiring layer 109 to the metal wiring layer 103, and surrounds other portions of the support leg metal wiring layer 109 than the lower portion by the side wall 106, the insulating layer 104, the support leg lower portion insulating layer 108, and the support leg upper portion insulating layer 110.

Figure 10:
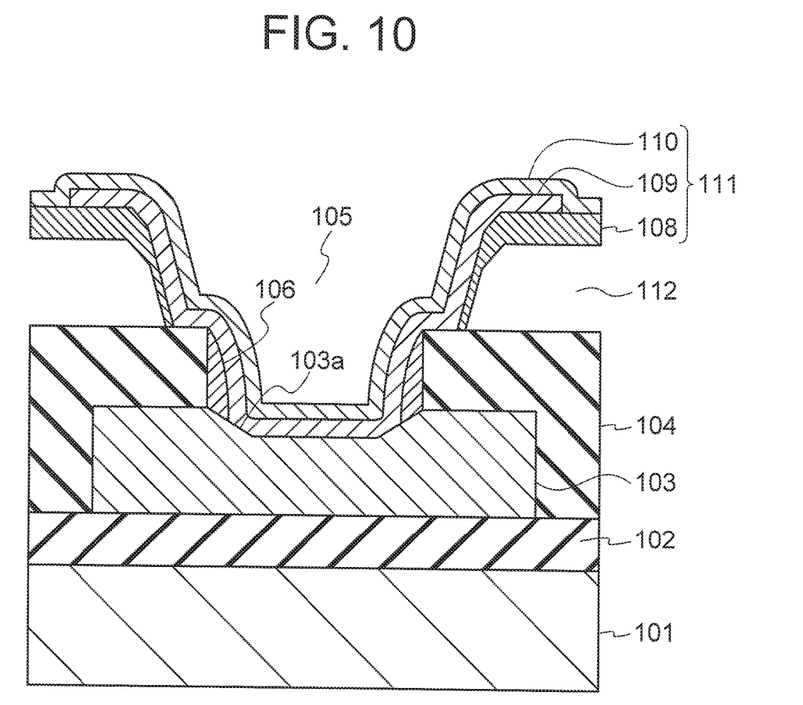
FIG. 10 is a structural sectional view for illustrating a seventh process of forming the support legs in the first embodiment of the present invention.

As illustrated in FIG. 10, the sacrificial layer 107 is removed next by etching from the layer structure illustrated in FIG. 9, along with a portion of the support substrate 101 that needs to be removed by etching, to thereby form a gap 112 between the support legs 111 and the insulating layer 104. The sacrificial layer 107, which is an organic material, can be etched by a known aching technology that uses O$_2$ plasma. The unnecessary portion of the support substrate 101 can be etched by dry etching that uses a XeF$_2$ gas.

According to the first embodiment, in an infrared sensor that includes infrared sensor pixels, a contact hole formed in each infrared sensor pixel to electrically connect a metal wiring layer, which is electrically connected to signal reading circuits, and a support leg metal wiring layer, which is located inside the support leg, has a configuration described below.

The contact hole is formed by etching an insulating layer that is formed by deposition so as to cover the metal wiring layer, and has a bottom portion and a side wall portion that are shaped into forward tapered shapes.

With the contact hole formed as this, the contact hole side wall has no vertical portion, and one of the problems of the related art in which an overhang on the side wall portion causes a decrease in thickness is accordingly prevented when the support leg metal wiring layer is formed with the use of a known PVD technology. This means that the support leg metal wiring layer can be a thin film. Forming the support leg metal wiring layer into a thin film in the infrared sensor is therefore accomplished by devising a better-suited shape for the contact hole that is formed in each infrared sensor pixel, even when the support leg length needs to be short, with the result that the heat conductance of the support legs is prevented from rising.

Consequently, narrowing the pixel pitch and reducing the heat conductance of the support legs are balanced in the infrared sensor. An infrared solid-state image pickup apparatus that is equipped with this infrared sensor is expected to accomplish the downsizing and price lowering of the infrared solid-state image pickup apparatus.

Second Embodiment

Figure 11:
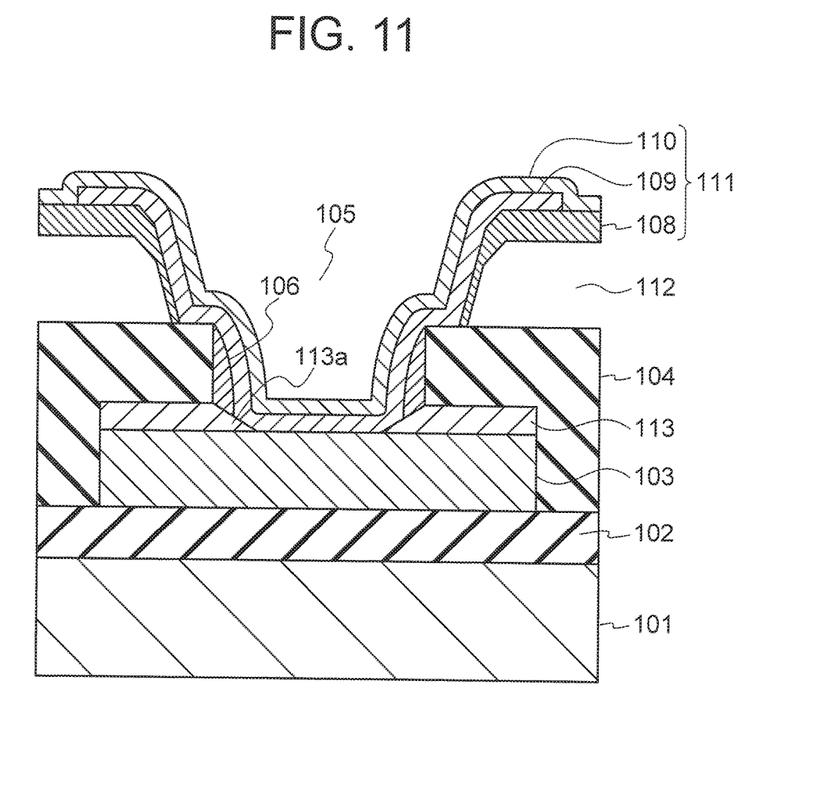
FIG. 11 is a structural sectional view for illustrating support legs in a second embodiment of the present invention.

A second embodiment of the present invention deals with a case in which an anti-reflection layer 113 is formed by deposition on the metal wiring layer 103, and etching processing is performed on the anti-reflection layer 113 so that a forward tapered portion 113a is formed without etching the metal wiring layer 103. In the second embodiment, descriptions on points that are the same as those in the first embodiment are omitted, and the description of the second embodiment focuses on differences from the first embodiment.

The first embodiment has a configuration in which the forward tapered portion 103a is formed in the metal wiring layer 103. In contrast, the second embodiment has a configuration in which a titanium nitride film, for example, is formed by deposition as the anti-reflection layer 113 directly on the metal wiring layer 103 and the forward tapered portion 113a is formed in the anti-reflection layer 113, instead of forming the forward tapered portion 103a in the metal wiring layer 103.

FIG. 11 is a structural sectional view for illustrating the support legs 111 in the second embodiment of the present invention. As illustrated in FIG. 11, the insulating layer 102 is formed by deposition on the support substrate 101, and the metal wiring layer 103 is formed directly on the insulating layer 102. The anti-reflection layer 113 is further formed by deposition directly on the metal wiring layer 103. The anti-reflection layer 113 can be, for example, a metal thin film formed from TiN or a similar material with the use of a known physical vapor deposition (PVD) technology. The effect of preventing reflection can be obtained when the anti-reflection layer 113 has a thickness of about 50 nm.

The insulating layer 104 is formed next by deposition on the insulating layer 102 with the use of, for example, a known P-CVD apparatus so as to cover the metal wiring layer 103 and the anti-reflection layer 113. Etching processing is subsequently performed on the insulating layer 104 by applying a known photoengraving technology and a known dry etching technology, to form the contact hole 105 as illustrated in FIG. 11.

In the etching processing performed on the insulating layer 104 to form the contact hole 105, the anti-reflection layer 113 is etched as well as the insulating layer 104 to an appropriate etching depth from the surface so that the forward tapered portion 113a is formed on an inner side surface of the anti-reflection layer 113. In other words, the anti-reflection layer 113 is also etched in the etching processing of the insulating layer 104 so that a bottom portion of the contact hole 105 is given a forward tapered shape, to thereby form the forward tapered portion 113a in an upper portion of the anti-reflection layer 113. Etching conditions for this include, for example, using an Ar/CF$_4$/CHF$_3$ gas and performing RIE by applying an RF power of 1.3 kW at a pressure of 300 mT.

A forward tapered surface is thus formed on a side surface of the bottom portion of the contact hole 105 by etching the anti-reflection layer 113 along with the insulating layer 104 so that the forward tapered portion 113a is formed.

Through subsequent steps that are the same as the ones in the first embodiment, the support legs 111 that are illustrated in FIG. 11 are ultimately obtained.

The contact hole 105 in the second embodiment is thus formed by etching the insulating layer 104, which is formed by deposition so as to cover the anti-reflection layer 113 formed on the metal wiring layer 103, as well as the metal wiring layer 103. The bottom portion of the contact hole 105 is given a forward tapered shape by forming the forward tapered portion 113a in the upper portion of the anti-reflection layer 113 in the etching for forming the contact hole 105.

According to the second embodiment, the bottom portion of the contact hole is given a forward tapered shape by etching the anti-reflection layer that is formed on the metal wiring layer so that the forward tapered portion is formed in the upper portion of the anti-reflection layer, instead of etching the metal wiring layer as in the method used in the first embodiment.

This eliminates the need to etch the metal wiring layer while obtaining the same effects as those in the first embodiment, and the ohmic contact performance is accordingly stabilized even more. In addition, the anti-reflection layer formed on the metal wiring prevents the reflection of an exposure light beam by the metal wiring in a photoengraving step subsequent to the metal wiring step, which makes it easy to obtain desired resist dimensions as compared to the first embodiment. A resultant advantage is, for example, the stabilization of the support leg width.

Third Embodiment

Figure 12:
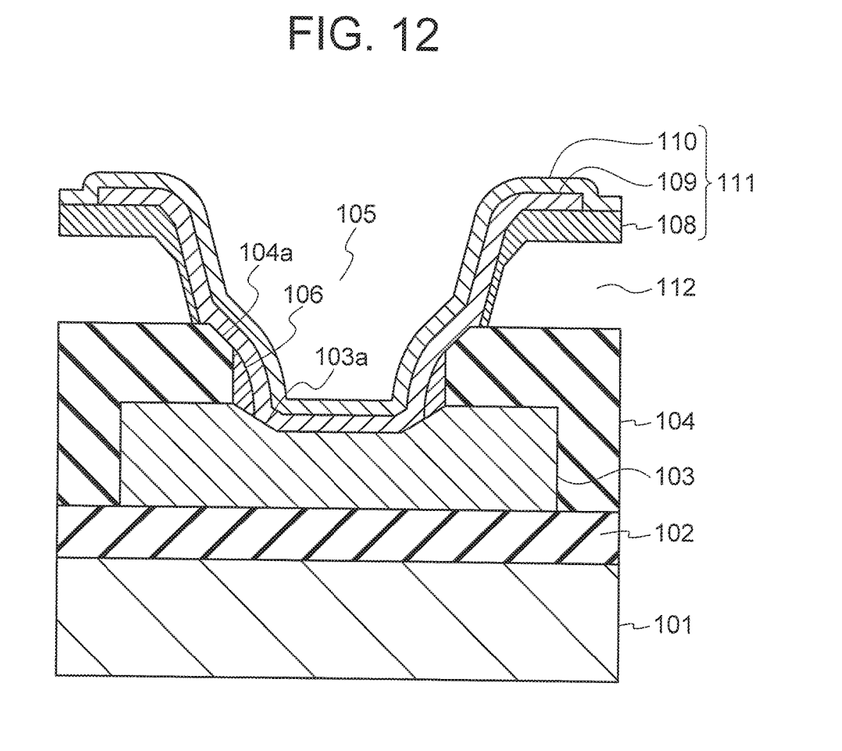
FIG. 12 is a structural sectional view for illustrating support legs in a third embodiment of the present invention.

A third embodiment of the present invention deals with a case in which a forward tapered portion 104a is formed in an upper portion of the inner side surface of the insulating layer 104 in addition to forming the forward tapered side wall 106 on the side wall portion of the contact hole 105. In the third embodiment, descriptions on points that are the same as those in the first embodiment are omitted, and the description of the third embodiment focuses on differences from the first embodiment.

In the first embodiment, tapered surfaces are formed in the bottom portion and side wall portion of the contact hole 105 by forming the forward tapered portion 103a in the upper portion of the metal wiring layer 103 and forming the forward tapered side wall 106 on the inner side surface of the insulating layer 104. In contrast, forward tapered surfaces are formed in the opening, side wall portion, and bottom portion of the contact hole 105 in the third embodiment by forming the forward tapered portion 104a in the upper portion of the inner side surface of the insulating layer 104 in addition to forming the forward tapered portion 103a and the side wall 106.

FIG. 12 is a structural sectional view for illustrating the support legs 111 in the third embodiment of the present invention. As illustrated in FIG. 12, the insulating layer 102 is formed by deposition on the support substrate 101, and the metal wiring layer 103 is formed directly on the insulating layer 102.

The insulating layer 104 is formed next by deposition on the insulating layer 102 with the use of, for example, a known plasma chemical vapor deposition (P-CVD) apparatus so as to cover the metal wiring layer 103. Etching processing is subsequently performed on the insulating layer 104 by applying a known photoengraving technology, a known wet etching technology, and a known dry etching technology, to form the contact hole 105.

As a preliminary step to the etching processing performed on the insulating layer 104 to form the contact hole 105, the forward tapered portion 104a is formed on the inner side surface of the insulating layer 104 by applying, for example, a wet etching technology and etching the insulating layer 104 to an appropriate depth from the surface of the insulating layer 104. The wet etching can use hydrofluoric acid or other chemical solutions that are used to etch an oxide film. For dry etching, an $Ar/CF_4/CHF_3$ gas can be used to perform RIE by applying an RF power of 1.3 kW at a pressure of 300 mT.

The etching depth of the insulating layer 104 that is etched by wet etching is adjusted suitably so that side etching does not interfere with contact holes of adjacent patterns, and so that design standards set in advance are fulfilled.

After the etching processing of the insulating layer 104 is performed to form the forward tapered portion 104a by wet etching, the metal wiring layer 103 is etched as well as the insulating layer 104 by dry etching so that the forward tapered portion 103a is formed on an inner side surface of the metal wiring layer 103.

The contact hole 105 in the third embodiment thus has an opening, a side wall portion, and a bottom portion that are all shaped into forward tapered shapes. Specifically, the opening of the contact hole 105 is given a forward tapered shape by forming the forward tapered portion 104a in the upper portion of the insulating layer 104 prior to the etching for forming the contact hole 105. With this configuration, disconnection between the support leg metal wiring layer and the metal wiring layer due to the overhang shape can be prevented when the support leg metal wiring layer is formed by PVD.

Through subsequent steps that are the same as the ones in the first embodiment, the support legs 111 that are illustrated in FIG. 12 are ultimately obtained.

While the third embodiment deals with a case in which the configuration of the first embodiment is modified so that the opening of the contact hole 105 is given a forward tapered shape, the configuration of the second embodiment can also be modified so that the opening of the contact hole 105 is given a forward tapered shape.

According to the third embodiment, the contact hole has an opening that is shaped into a forward tapered shape in addition to a forward tapered bottom portion and a forward tapered side wall portion, whereas the bottom portion and side wall portion of the contact hole have forward tapered shapes in the first embodiment and the second embodiment. This prevents an overhang shape from being formed when the support leg metal wiring layer is formed with the use of a PVD technology, and forming the support leg metal wiring layer into a thin film is therefore accomplished even more easily than in the first embodiment and the second embodiment.

What is claimed is:

1. An infrared sensor, comprising an infrared sensor pixel in which a contact hole is formed to electrically connect a metal wiring layer and a support leg metal wiring layer, the metal wiring layer being electrically connected to a signal reading circuit, the support leg metal wiring layer being located inside a support leg,
    wherein the contact hole is formed by etching an insulating layer that is formed by deposition so as to cover the metal wiring layer, and
    wherein the contact hole has a bottom portion and a side wall portion that are each shaped into a forward tapered shape,
    wherein the support leg metal wiring layer extends through the contact hole and parallel to the bottom portion and the side wall portion that are each shaped into the forward tapered shape.

2. The infrared sensor according to claim 1, wherein the side wall portion of the contact hole is given the forward tapered shape by forming a side wall that has a forward tapered shape on an inner side surface of the insulating layer after the etching.

3. The infrared sensor according to claim 1, wherein the bottom portion of the contact hole is given the forward tapered shape by forming a forward tapered portion in an upper portion of the metal wiring layer in the etching.

4. The infrared sensor according to claim 1,
    wherein the contact hole is formed by etching the insulating layer that is formed by deposition so as to cover an anti-reflection layer in addition to the metal wiring layer, the anti-reflection layer being formed on the metal wiring layer, and
    wherein the bottom portion of the contact hole is given the forward tapered shape by forming a forward tapered portion in an upper portion of the anti-reflection layer in the etching.

5. The infrared sensor according to claim 1, wherein an opening of the contact hole, as well as the bottom portion of the contact hole and the side wall portion of the contact hole, has the forward tapered shape.

6. The infrared sensor according to claim 1, wherein an opening of the contact hole is given the forward tapered shape by forming a forward tapered portion in an upper portion of the insulating layer prior to the etching.

7. The infrared sensor according to claim 1, wherein the infrared sensor comprises a thermal infrared sensor.

8. An infrared solid-state image pickup apparatus, comprising the infrared sensor of claim 1.

9. The infrared sensor according to claim 1, wherein the support leg metal wiring layer directly contacts the metal wiring layer.

10. The infrared sensor according to claim 1, wherein the support leg metal wiring layer comprises a thin film that directly contacts the metal wiring layer.

11. The infrared sensor according to claim 1, wherein a support leg insulating layer is formed so as to cover the support leg metal wiring layer, and
    wherein the support leg insulating layer extends into the contact hole along an upper surface of the support leg metal wiring layer.

12. The infrared sensor according to claim 11, wherein a thickness of the support leg insulating layer is between 50 nm and 300 nm.

13. The infrared sensor according to claim 12, wherein the support leg insulating layer extends parallel to the bottom portion and the side wall portion that are each shaped into the forward tapered shape.

14. The infrared sensor according to claim 11, wherein the support leg insulating layer extends parallel to the bottom portion and the side wall portion that are each shaped into the forward tapered shape.

* * * * *